United States Patent
Xu et al.

(10) Patent No.: US 6,698,191 B2
(45) Date of Patent: Mar. 2, 2004

(54) HIGH EFFICIENCY CONVERSION OF NITROGEN OXIDES IN AN EXHAUST AFTERTREATMENT DEVICE AT LOW TEMPERATURE

(75) Inventors: Lifeng Xu, Farmington Hills, MI (US); Robert Walter McCabe, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,243

(22) Filed: Aug. 9, 2001

(65) Prior Publication Data

US 2003/0037542 A1 Feb. 27, 2003

(51) Int. Cl.⁷ .................................................. F01N 3/00
(52) U.S. Cl. ........................ 60/286; 60/274; 60/277; 60/285; 60/295
(58) Field of Search .......................... 60/286, 274, 295, 60/303, 285, 277

(56) References Cited

U.S. PATENT DOCUMENTS

| | | | |
|---|---|---|---|
| 4,403,476 A | 9/1983 | Johnson et al. | |
| 4,854,123 A | 8/1989 | Inoue | |
| 5,201,802 A | 4/1993 | Hirota et al. | |
| 5,369,956 A | 12/1994 | Daudel et al. | |
| 5,410,873 A * | 5/1995 | Tashiro | 60/276 |
| 5,522,218 A | 6/1996 | Lane et al. | |
| 5,540,047 A | 7/1996 | Dahlheim et al. | |
| 5,609,022 A | 3/1997 | Cho | |
| 5,609,026 A | 3/1997 | Berriman et al. | |
| 5,628,186 A | 5/1997 | Schmelz | |
| 5,657,625 A | 8/1997 | Koga et al. | |
| 5,785,937 A | 7/1998 | Neufert et al. | |
| 5,842,341 A * | 12/1998 | Kibe | 60/274 |
| 5,845,487 A | 12/1998 | Fraenkle et al. | |
| 5,924,280 A | 7/1999 | Tarabulski | |
| 5,950,422 A | 9/1999 | Dolling | |
| 5,974,794 A * | 11/1999 | Gotoh et al. | 60/286 |
| 5,975,046 A * | 11/1999 | Kaneko et al. | 123/300 |
| 5,992,142 A * | 11/1999 | Pott | 60/274 |
| 6,082,102 A | 7/2000 | Wissler et al. | |
| 6,089,015 A | 7/2000 | Strehlau et al. | |
| 6,119,448 A * | 9/2000 | Emmerling et al. | 60/274 |
| 6,119,451 A | 9/2000 | Vogtlin et al. | |
| 6,125,629 A | 10/2000 | Patchett | |
| 6,182,444 B1 * | 2/2001 | Fulton et al. | 60/277 |
| 6,269,634 B1 * | 8/2001 | Yokota et al. | 60/286 |

FOREIGN PATENT DOCUMENTS

| | | |
|---|---|---|
| DE | 10041891 | 4/2001 |
| EP | 1069288 | 1/2001 |
| GB | 2267365 | 12/1993 |
| GB | 2352651 | 2/2001 |
| GB | 2375059 | 11/2002 |
| WO | WO 99/55446 | 11/1999 |

* cited by examiner

Primary Examiner—Binh Tran
(74) Attorney, Agent, or Firm—Diana D. Brehob

(57) ABSTRACT

A system and method for providing reductant to a lean NOx catalyst, when the temperature in the lean NOx catalyst is greater than 300° C., is disclosed. After the reductant is supplied under these conditions, the NOx conversion efficiency of the lean NOx catalyst in the 140–250° C. temperature range is increased.

8 Claims, 8 Drawing Sheets

HIGH EFFICIENCY CONVERSION OF NITROGEN OXIDES IN AN EXHAUST AFTERTREATMENT DEVICE AT LOW TEMPERATURE

BACKGROUND OF INVENTION

The present invention relates to a system and a method for improving conversion efficiency of a lean NOx catalyst in a diesel or lean burn gasoline engine, and, more particularly, to improving conversion efficiency by controlling delivery of a NOx reductant.

Internal combustion engines commonly rely on exhaust aftertreatment devices to convert regulated components: carbon monoxide, hydrocarbons, and nitrogen oxides (NOx), into carbon dioxide, water, nitrogen, and oxygen. Exhaust catalysts have been extensively developed to obtain high conversion efficiencies on stoichiometric exhaust gases. Stoichiometric conditions are achieved when the fuel and oxidizer supplied to the engine is in a proportion which, if reaction of the fuel were complete, produce carbon dioxide, water, and nitrogen. It is known to those skilled in the art, though, that higher fuel efficiency is obtained from engines operating at air-fuel ratios lean of stoichiometric, that is, with an excess of air. These lean burning engines may be diesel engines, stratified-charge gasoline engines in which the fuel and air are only partially mixed, and homogeneous-charge, lean-burn gasoline engines in which the fuel and air are mostly premixed prior to combustion. Because of the desire for high fuel efficiency, lean burning engines are in production and continue to be developed. It is known to those skilled in the art to use a NOx catalyst and continuously supply reductant to the catalyst to convert NOx while operating lean.

The inventors of the present invention have recognized that if reductant is supplied when the catalyst is at high temperatures, the subsequent NOx conversion efficiency of the catalyst is higher than heretofore possible in the 140–250° C. temperature range.

SUMMARY OF INVENTION

The inventors of the present invention have recognized that substantially higher NOx conversion efficiencies of a lean NOx catalyst can be achieved by supplying reductant when the temperature in the lean NOx catalyst is greater than about 300° C. The inventors recognized that a lean NOx catalyst may periodically achieve the desired temperature range and reductant may be supplied to the lean NOx catalyst in response.

Disadvantages of prior approaches are overcome by a method for controlling reductant addition to exhaust gases of an internal combustion engine. The reductant and exhaust gases flow into a catalyst coupled to the engine. An indication that temperature of the catalyst is higher than a predetermined temperature is provided. In response to the indication, reductant is added into the exhaust gases. An estimate of a stored quantity of reductant within the catalyst is provided. The reductant addition step is substantially discontinued when the stored quantity exceeds a predetermined quantity.

A primary advantage of the present invention is that a lean NOx catalyst processing lean exhaust gases operates with substantially higher conversion efficiency in a lower temperature range than heretofore possible. Another advantage of the present invention is that after storing reductant under prescribed conditions, reductant delivery can be lessened or discontinued. Furthermore, significantly less reductant is supplied to the catalyst than prior art methods.

Yet another advantage of the invention herein, over prior art, is that because less reductant is supplied to the catalyst, less reductant slips through the catalyst into the tailpipe.

The above advantages and other advantages, objects, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
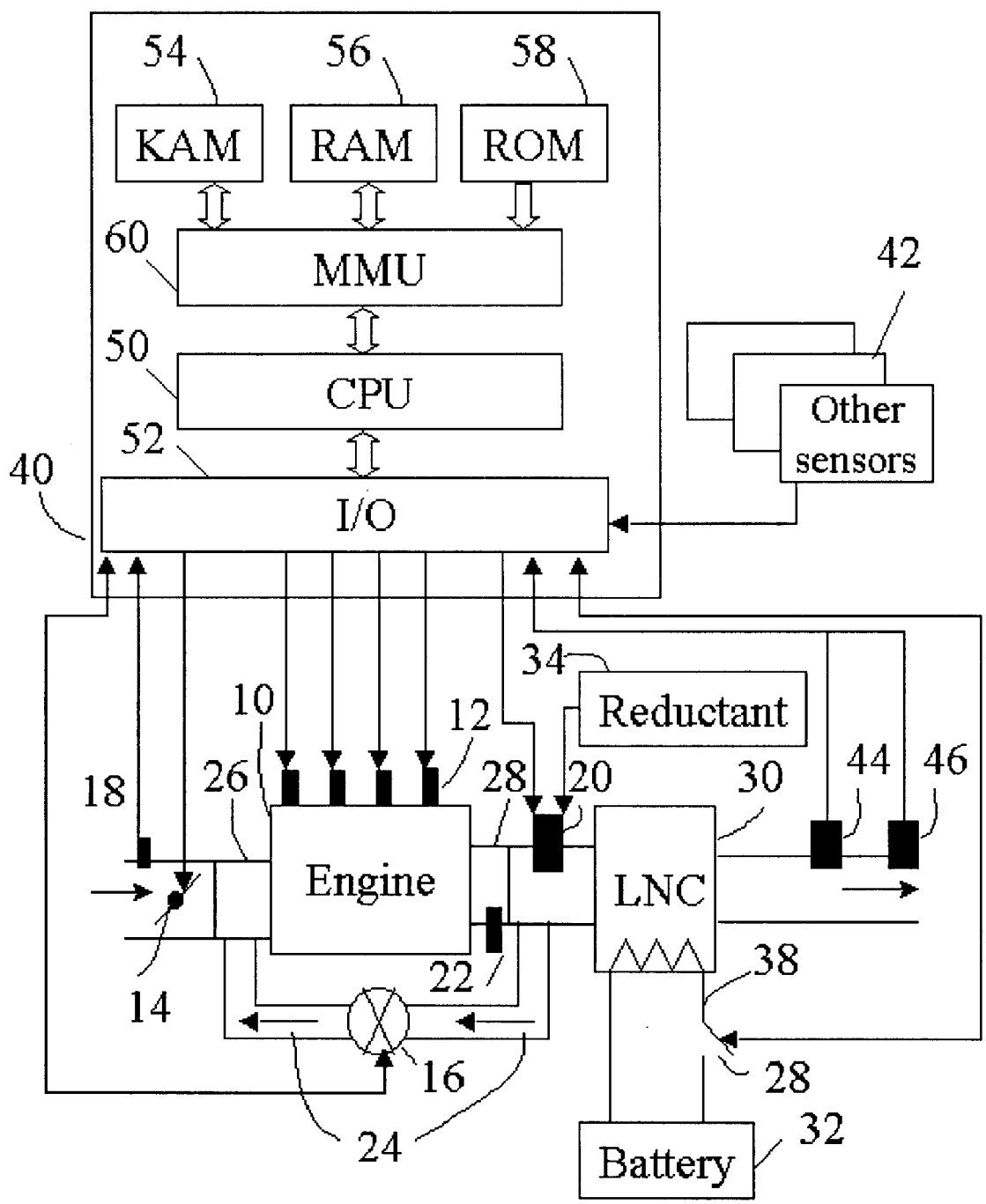
FIG. 1 is a schematic diagram of an internal combustion engine according to an aspect of the present invention.

In FIG. 1, an internal combustion engine 10 is supplied air through an intake line in which a throttle valve 14 may be disposed. Position of throttle valve 14 may be controlled by an electronic control unit (ECU) 40. A mass airflow sensor 18 may be placed in the intake line, supplying a signal to ECU 40 indicative of intake airflow into engine 10. Alternatively, a speed density system may be used to infer intake airflow. Speed density relies on a sensor in the intake system providing an indication of pressure in the intake manifold and an engine speed sensor, shown as other sensors 42. Engine 10 is supplied fuel by injectors 12 (fuel supply to injectors 12 not shown). Fuel injection timing and duration may be controlled by mechanical means. More commonly, however, the fuel injection system is of a type, eg., common rail design, which allows timing and duration to be controlled by ECU 40. Engine 10 may be equipped with an exhaust gas recirculation (EGR) system, which connects exhaust manifold 28 to intake manifold 26 with valve 16 controlling the flow area in EGR duct 24. The position of EGR valve 16 is controlled by ECU 40. EGR duct 24, in which EGR valve 16 resides, communicates with intake manifold 26 downstream of throttle 14. Exhaust gases flow into intake manifold 26 when a lower pressure exists in intake manifold 26, by virtue of throttle 14 being partially closed, and EGR valve 16 being partially or fully open.

Exhaust gases of engine 10 are directed into a lean NOx catalyst (LNC) 30, described in more detail later herein.

Upstream of lean NOx catalyst 30 is reductant injector 20, which is supplied reductant from reductant tank 34. Reductant is injected into the exhaust gases upstream of lean NOx catalyst 30. ECU 40 controls reductant injector 20. If reductant is fuel, the reductant may be injected by injectors 12 into the combustion chamber directly. The fuel injected by injectors 12 to be used as reductant would be injected at such a time in the cycle to avoid being consumed by the combustion event. Lean NOx catalyst 30 may contain a resistive heating element, so that it may be electrically heated, by connecting it to battery 32 by electrical wires 38, which include a switch 28. An electrical voltage may be applied or discontinued by closing or opening, respectively, switch 28.

Exhaust gas sensor 22 may be a NOx sensor, placed in the exhaust line upstream of lean NOx catalyst 30 to detect concentration of NOx entering lean NOx catalyst 30. Exhaust gas sensor 44 may be a NOx sensor used to detect effectiveness of lean NOx catalyst 30. Exhaust gas sensor 46 may be an ammonia sensor to detect slippage of ammonia-containing reductant from lean NOx catalyst 30. Alternatively, exhaust gas sensor 46 may be a hydrocarbon sensor, in the event that the reductant is a hydrocarbon.

The term lean, used herein with reference to the mixture supplied to the combustion chamber of engine 10 or of the exhaust gases supplied to the lean NOx catalyst 30, refers to the chemical stoichiometry of the gases. Mixtures containing air in excess of that required to fully consume the fuel are referred to as lean. Rich mixtures contain excess fuel. The products of lean combustion produce lean exhaust gases and vice versa.

ECU 40 has a microprocessor 50, called a central processing unit (CPU), in communication with memory management unit (MMU) 60. MMU 60 controls the movement of data among the various computer readable storage media and communicates data to and from CPU 50. The computer readable storage media preferably include volatile and non-volatile storage in read-only memory (ROM) 58, random-access memory (RAM) 56, and keep-alive memory (KAM) 54, for example. KAM 54 may be used to store various operating variables while CPU 50 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 50 in controlling the engine or vehicle into which the engine is mounted. The computer-readable storage media may also include floppy disks, CD-ROMs, hard disks, and the like. CPU 50 communicates with various sensors and actuators via an input/output (I/O) interface 52. Examples of items that are actuated under control by CPU 50, through I/O interface 52, are fuel injection timing, fuel injection rate, fuel injection duration, EGR valve position, throttle valve position, and reductant injection timing and duration. Sensors communicating input through I/O interface 52 may be indicating engine speed, vehicle speed, coolant temperature, manifold pressure, pedal position, throttle valve position, EGR valve position, air temperature, and exhaust temperature. Some ECU 40 architectures do not contain MMU 60. If no MMU 60 is employed, CPU 50 manages data and connects directly to ROM 58, RAM 56, and KAM 54. Of course, the present invention could utilize more than one CPU 50 to provide engine/vehicle control and ECU 40 may contain multiple ROM 58, RAM 56, and KAM 54 coupled to MMU 60 or CPU 50 depending upon the particular application.

Lean NOx catalyst 30 is an exhaust aftertreatment device which processes the products of lean combustion. Although gases within LNC 30 are overall lean, a condition which normally favors oxidation, NOx reduction can occur on catalyst surfaces in the presence of reductant. A reductant, such as hydrocarbons or ammonia, is absorbed on catalyst surfaces to promote NOx reaction to benign products, $N_2$ and $H_2O$. An example formulation for LNC 30 is one with Cu-β-zeolite and no precious metals.

Prior to explaining how the present invention allows injection of a lesser amount of reductant than prior art methods while achieving even higher NOx conversion efficiency, phenomena relevant to the present invention, which were discovered by the inventors herein, is discussed.

Figure 2:
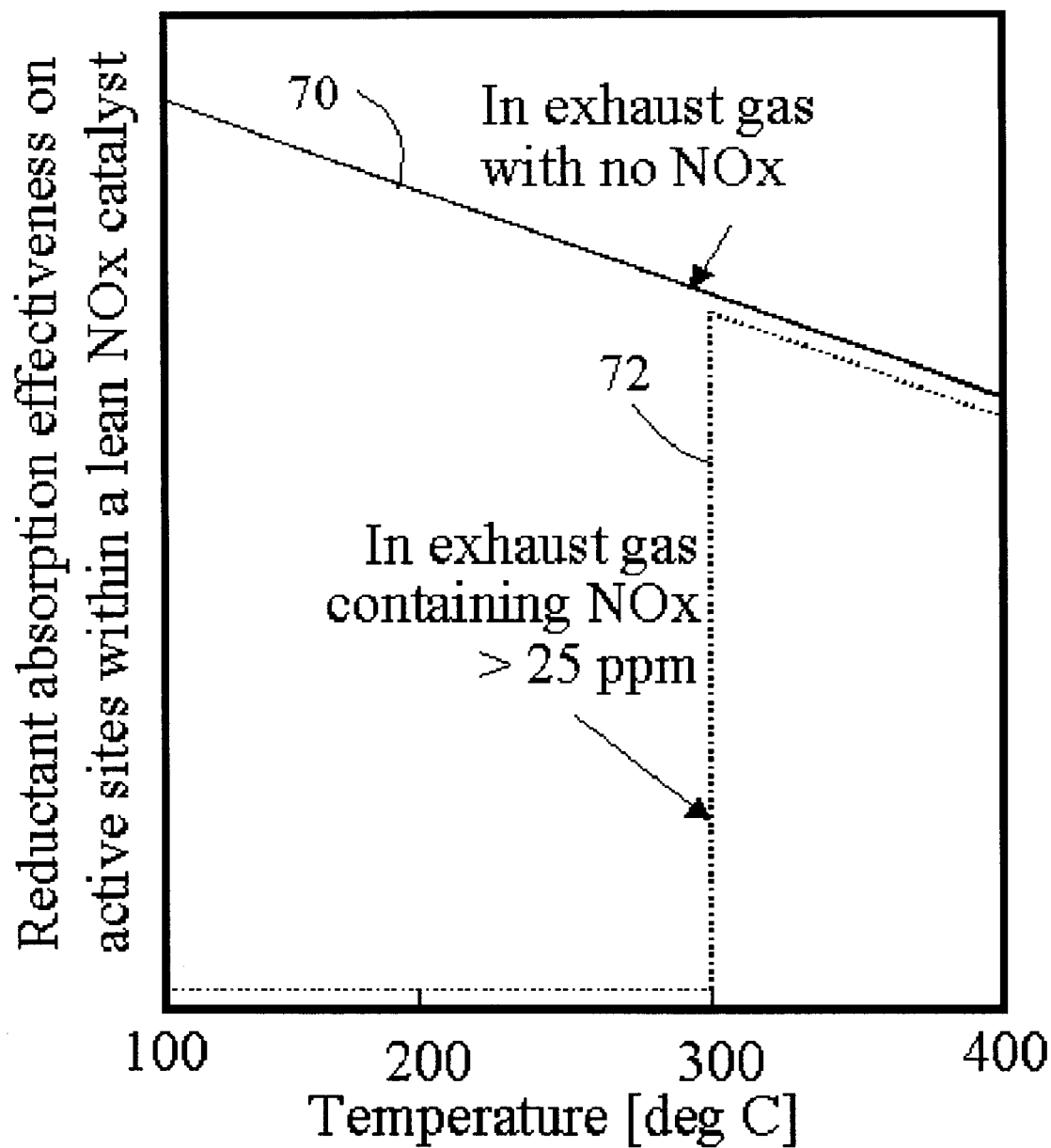
FIG. 2 is a graph of the absorption characteristics of ammonia-containing reductant in a lean NOx catalyst.

Referring now to FIG. 2, absorption characteristics of ammonia containing urea on the surfaces of a lean NOx catalyst (LNC) are shown. The solid line 70 is a typical absorption curve. That is, the amount of material absorbed on the catalyst's active sites reduces as temperature is increased. The inventors of the present invention have theorized that there exists a distinction between active sites and inactive sites on the catalyst surface. Ammonia absorbs both onto active and inactive sites on the catalyst surface according to typical absorption phenomena, curve 70 in FIG. 3, in the absence of NOx in exhaust gases within the catalyst. The inventors of the present invention have theorized that NOx also absorbs onto surfaces in the catalyst. If the NOx concentration of the gases in the catalyst exceeds about 25 ppm, NOx absorbs onto most active sites and prevents reductant from absorbing onto those active sites. The dotted curve 72 of FIG. 2 illustrates absorption phenomena of ammonia on active sites within LNC 30 in the presence of NOx at a concentration of about 25 ppm or greater. At temperatures below a threshold temperature (believed to be about 300° C. based on experimental findings), reductant absorption on active sites is negligible due to NOx inhibition. When the temperature of the LNC approaches the threshold temperature, NOx desorbs from the active sites, allowing reductant to occupy them. Curve 72 of FIG. 2 shows a stepwise change in reductant absorption at a threshold temperature. In reality, the NOx inhibition effect disappears over a small range in temperature, not stepwise as shown in FIG. 2. At temperatures higher than the threshold temperature, NOx no longer inhibits absorption by ammonia on active sites. Thus, curves 70 and 72 are substantially identical at temperatures above the threshold temperature, i.e., reductant exhibits typical absorption behavior on active sites when NOx inhibition effects are removed.

FIG. 2 illustrates that there are two ways that reductant can be absorbed onto active sites in LNC 30. The solid curve 70 indicates it occurs when the exhaust gas contains no NOx. In practice, it was found that the exhaust gas may contain as much as about 25 ppm NOx without NOx inhibiting absorption of reductant on active sites within LNC 30, shown as curve 70. Curve 72 of FIG. 2 indicates that absorption of reductant on active sites may also occur when LNC 30 is above a temperature threshold. In summary exhaust NOx must be lower than 25 ppm or temperature of LNC 30 must be greater than about 300° C. for reductant to be absorbed on active sites.

Figure 3:
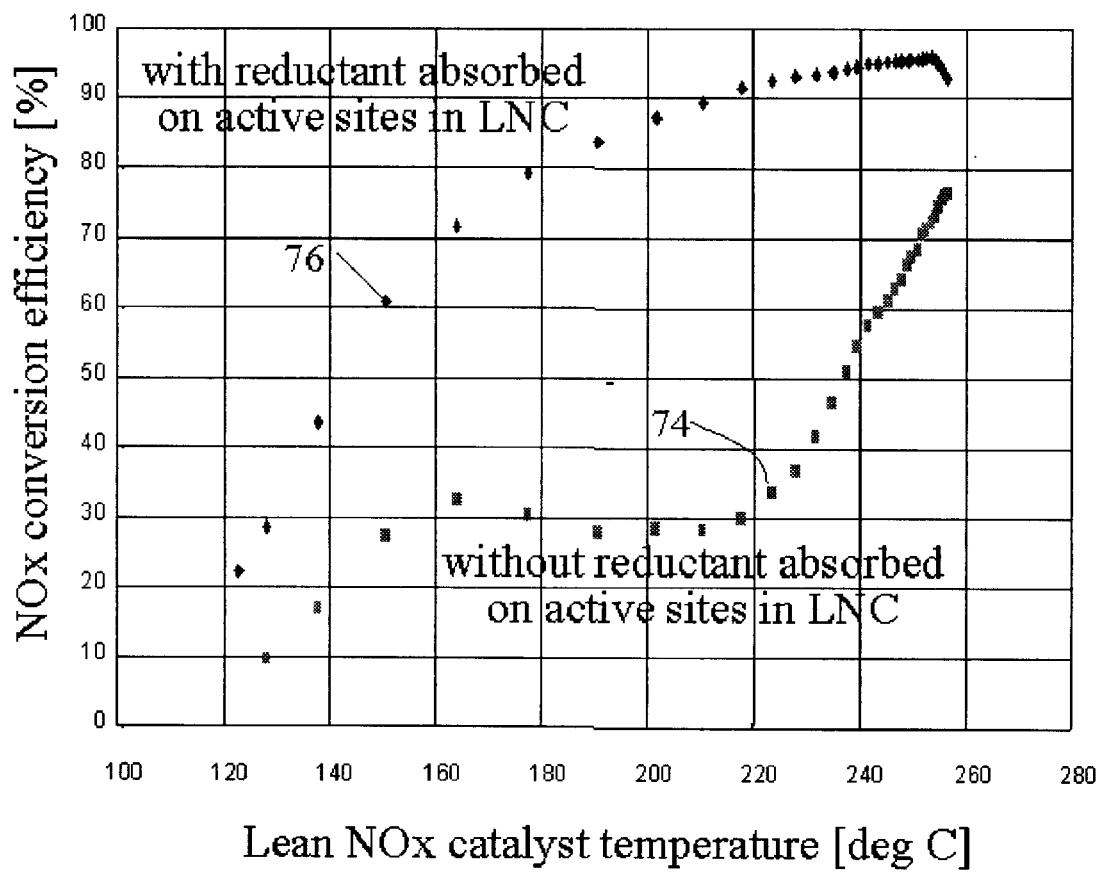
FIG. 3 is a graph of the NOx conversion efficiency of a lean NOx catalyst as a function of temperature.

The significance of absorbing reductant on active sites is shown in FIG. 3. As mentioned above, LNC 30 operates at fairly high NOx conversion efficiency at temperatures above about 250° C. regardless of how the reductant is supplied.

This is indicated in FIG. 3 in which NOx conversion efficiency rises dramatically starting at about 220° C. (rectangles in FIG. 3) and achieves about 70% efficiency at 250° C. However, as mentioned above, the exhaust gases discharged from a diesel engine are too cool, over much of the operating cycle, to cause LNC 30 to be above 250° C. A typical NOx conversion efficiency of LNC 30, without reductant absorbed on active sites, (rectangles in FIG. 3) is about 30% for temperatures below 250° C. This leads to less than desired NOx conversion efficiencies of LNC 30 applied to diesel engine exhaust when the reductant is supplied by prior art methods. However, if reductant is absorbed onto active sites in the LNC 30, the conversion efficiency is between about 50% and 95% in the 140–250° C. temperature range (diamonds in FIG. 3). By improving the NOx conversion efficiency in the 140–250° C. temperature range, a critical range for diesel applications, the overall NOx conversion efficiency of LNC 30, over a typical driving cycle, can be increased markedly.

In the discussion above, the term NOx conversion efficiency is used in conjunction with LNC 30; another term that may applied to explain the phenomena is reaction rate. Reductant that is supplied under prescribed conditions has a faster reaction rate with NOx leading to a higher NOx conversion efficiency. The inventors of the present invention theorize that a higher reaction rate involving reductant and NOx is achieved by storing reductant on active sites within the catalyst. Conversely, reductant that is stored on inactive sites reacts with NOx at a lower reaction rate, thus leading to a lower NOx conversion efficiency.

FIGS. 2 and 3 are relevant for absorption of ammonia in LNC 30. Urea is an aqueous solution containing ammonia, which may be used as a reductant in LNC 30. The phenomena described above may be applicable to other reductants, which may be identified in the future.

The above discussion of NOx absorption in LNC 30 may erroneously cause the reader of this specification to assume that LNC 30 absorbs a substantial quantity of NOx. The quantity of NOx absorbed in LNC 30 is neglible in relation to exhaust levels of NOx; nevertheless, the small quantity of NOx that is absorbed in LNC 30 is sufficient to inhibit the reductant from being absorbed on active sites in LNC 30.

Discussion of storage of NOx may also cause the reader of the specification to confuse a LNC with a lean NOx trap (LNT). Distinctions between a LNT and a LNC are demonstrated in FIG. 4. In curve 78 for a LNT, lambda is shown. During the operation when lambda is greater than 1, that is a lean air-fuel ratio, NOx is absorbed in the LNT, i.e., little, if any, reduction of NOx is occurring. One such cycle is denoted over a period of $t_1$, which may be about 60 seconds. During the period of NOx absorption ($t_1$), the NOx is not being processed; instead it is being stored for later processing. Following the absorption of NOx, the air-fuel ratio is caused to be rich, shown as lambda of around 0.9, in curve 78, over an interval of $t_2$, which is several seconds long. When the air-fuel ratio is caused to be rich, more fuel is provided than can be oxidized with the air provided. Consequently, the exhaust products contain excess fuel or partially oxidized fuel, which serves as a reductant for the LNT, as shown in curve 80. Thus, reductant, that is excess fuel, is supplied only during the $t_2$ interval. The reaction rate of NOx is shown in curve 82 for a LNT, during which absorbed NOx is released and reduced during the $t_2$ interval. The shape of curve 82 is an example only; the important feature of curve 82 is that significant NOx reduction only occurs during the $t_2$ period and that the rate of NOx reduction is negligible during the $t_1$ period.

Figure 4:
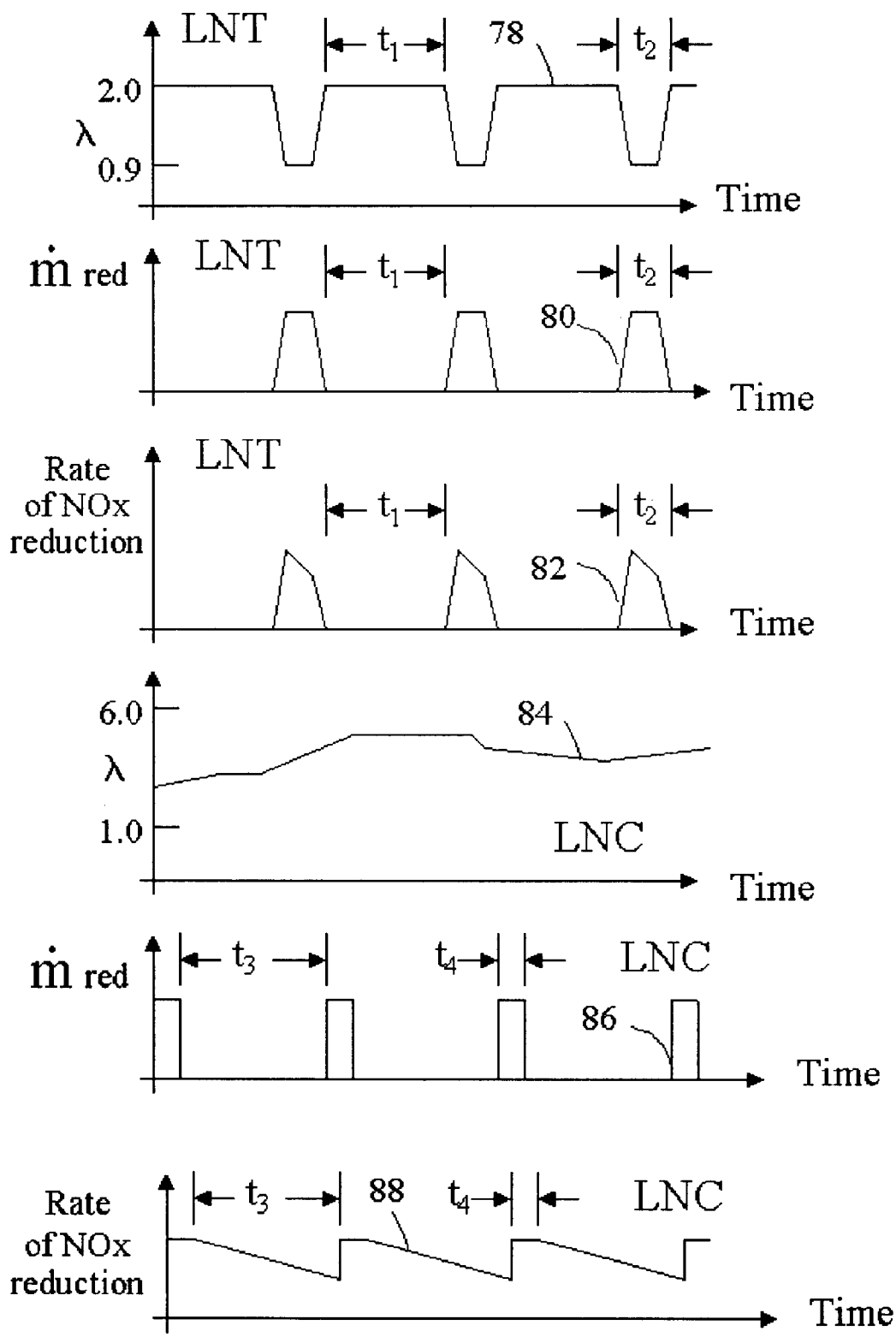
FIG. 4 shows operating timelines of air-fuel ratio, reductant delivery and NOx conversion rate for a lean NOx trap and a lean NOx catalyst, the latter according to an aspect of the present invention.

Referring now to curves 84, 86, and 88 of FIG. 4, an LNC 30 operating in accordance with an aspect of the present invention is shown. In curve 84, the air-fuel ratio is lean, that is, lambda is greater than 1.0. According to the present invention, the reductant is delivered during the $t_4$ interval of curve 86 and negligible during the $t_3$ interval. The inventors of the present invention have found that the $t_4$ interval, in typical operation with a LNC of typical volume, is about 3 minutes and the $t_3$ interval is about 10 seconds. That is, reductant is supplied for about 10 seconds or less and the reductant is depleted over an interval of 3 minutes. The rate of reduction of NOx, curve 88, indicates that NOx is being reduced continuously, with the rate of reduction increasing and decreasing somewhat over the cycle. However, the salient features are that NOx is reduced continuously and such reduction occurs during operation at lean air-fuel ratio with a lean NOx catalyst. This is in contrast with a LNT in which the reduction of NOx occurs during short NOx purging intervals, shown as interval $t_2$ in curve 82, which correspond to rich operation, shown as interval $t_2$ in curve 78.

Figure 5:
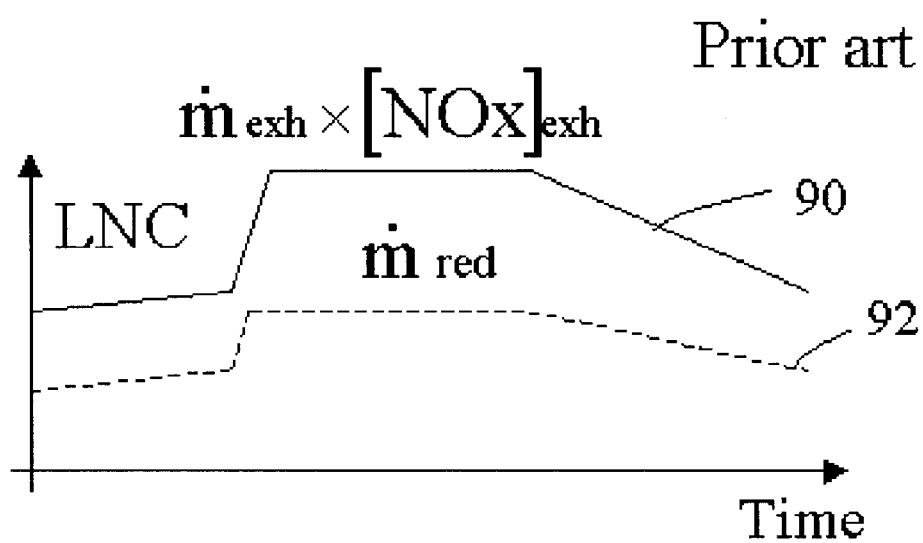
FIG. 5 shows operating timelines of a reductant delivery for a lean NOx catalyst according to prior art and an aspect of the present invention.
Figure 5:
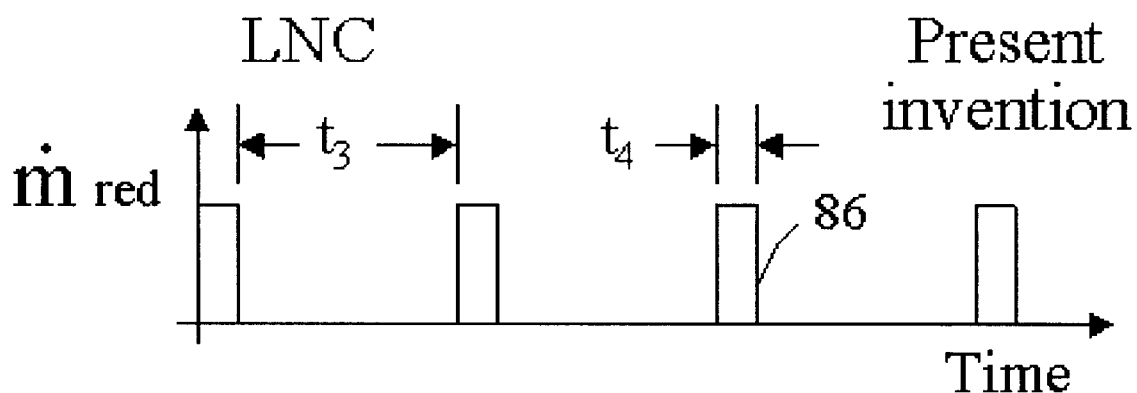

Referring now to FIG. 5, one example of a prior art method of reductant delivery to a LNC 30 is illustrated. The reductant delivered, curve 92, is in proportion to the mass flow rate of NOx in the exhaust gases, curve 90. Other schemes have been used to control reductant delivery rate. However, the common thread to prior art methods is that reductant is supplied substantially continuously. In the present invention, as shown in curve 86, reductant may be supplied over a short interval, denoted as $t_4$. The inventors herein have found reductant usage when practicing the present invention is about one-third less than prior art methods over a typical operating cycle. Furthermore, as discussed above, the present invention leads to higher NOx conversion efficiency compared with prior art methods. Both of these factors lead to less reductant slippage into the tailpipe.

Curve 86 of FIGS. 4 and 5 is one example of reductant delivery to a LNC. It may be found beneficial to supply a small amount of reductant during interval $t_3$. Also, $t_3$ and $t_4$ may not be identical in duration from cycle to cycle. Curve 86 is an example and not intended to be limiting.

Techniques by which the temperature can be raised in the catalyst are relevant to the present invention. Thus, methods known by those skilled in the art, which cause exhaust gas temperature increase are provided in Table 1.

TABLE 1

| Method | Description |
| --- | --- |
| Throttling the intake | Reduces flow rate of air through engine; energy released in combustion heats up less total mass; higher exhaust temperature. |
| Retard injection timing | By retarding injection timing, combustion is retarded and the pressure rise occurs later into the expansion stroke. The fraction of energy converted to shaft work is reduced and exhaust enthalpy is increased (higher exhaust temperature). |
| Electrical heating | Resistance heating of the catalyst. |
| Fuel burner in exhaust line | Introduce fuel into the oxygen-containing exhaust; ignite the exhaust gas. |
| Auxiliary fuel injection | Utilize in-cylinder fuel injector to inject after the main injection, i.e., during the expansion stroke. If secondary injection is early in the expansion stroke, fuel is inefficiently burned, leading to higher exhaust temperature. If secondary injection is late in the |

TABLE 1-continued

| Method | Description |
|---|---|
| | expansion stroke, fuel is unoxidized or partially oxidized. Unburned fuel contacting a catalyst with oxidizing action reacts causing an exotherm; exhaust temperature rises. |

Any of the methods in Table 1 may be used to achieve a temperature increase.

Storing reductant on active sites in LNC 30 may be accomplished in a passive manner or actively pursued. ECU 40 may determine that engine 10 is operating at a condition conducive to storing reductant on active sites and command reductant injector 20 to supply reductant during such a condition, an example of passively exploiting the phenomenon. Or, ECU 40 may actively cause engine 10 to operate at a condition which provides the necessary conditions within LNC 30 to absorb reductant on active sites.

Figure 6:
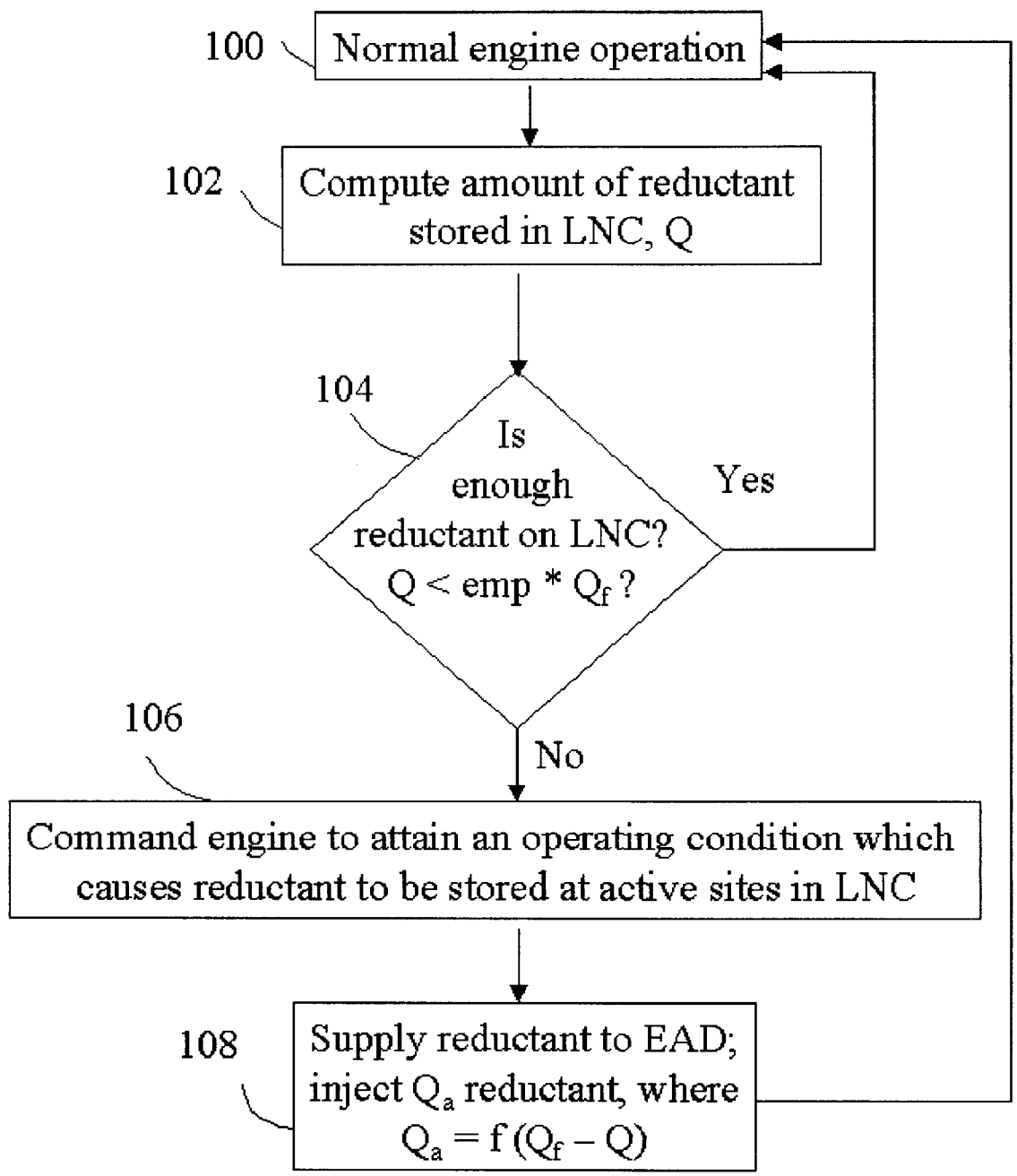
FIG. 6 is a flowchart indicating operation of the engine according to an aspect of the present invention.
Figure 7:
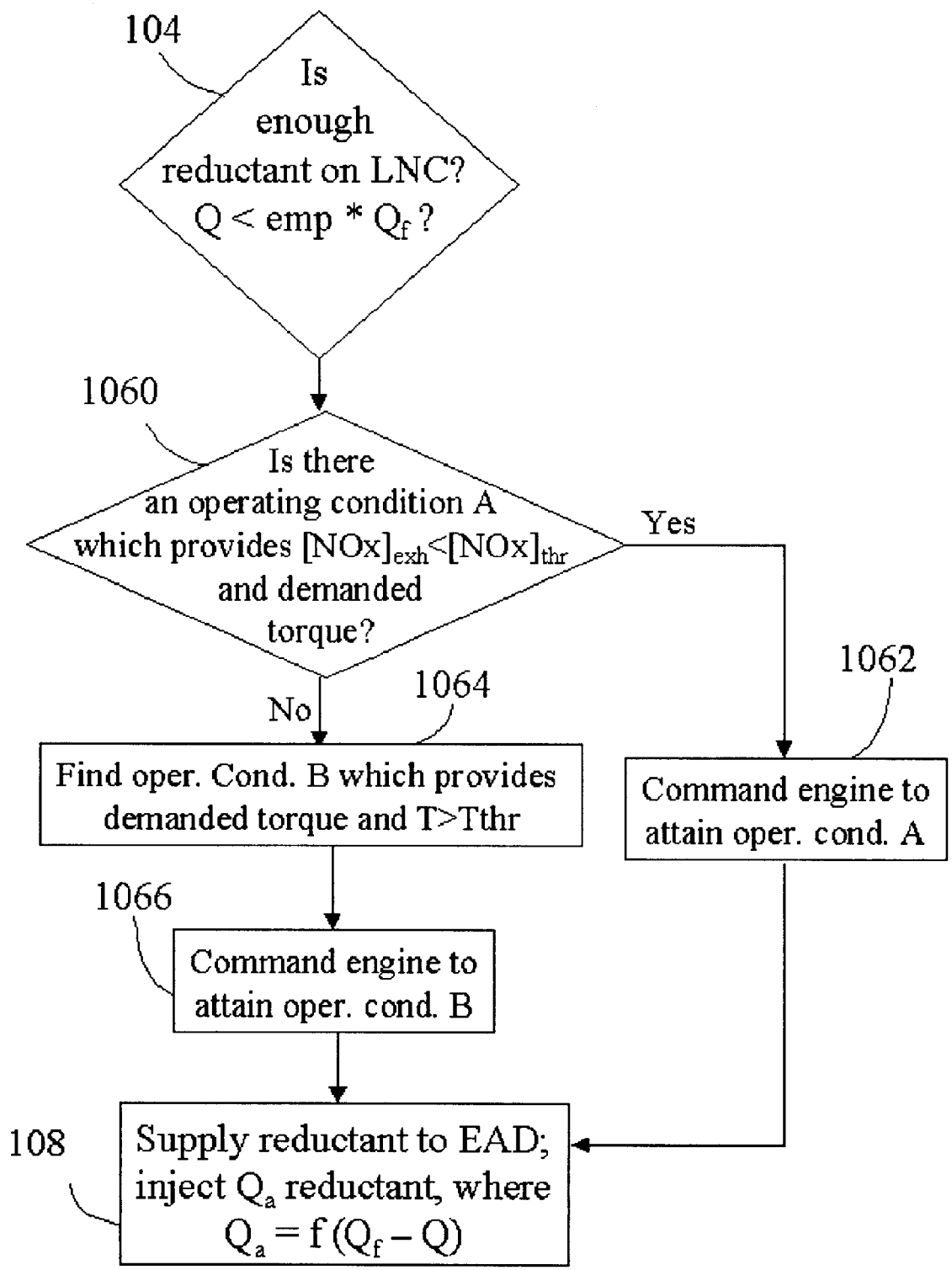
FIG. 7 is an expanded view of a portion of FIG. 6 according to an aspect of the present invention.

FIG. 6 is a flowchart indicating an active control scheme. Engine 10 is operating normally in block 100; that is, ECU 40 controls engine 10 independently of LNC 30 concerns. Periodically, control is passed to block 102, in which the quantity of reductant absorbed on active sites, Q, remaining in LNC 30 is determined. This may be modeled in the ECU 40 based on time elapsed since reductant addition, operating condition history since last reductant addition, condition of LNC 30, exhaust gas sensor signals, and inference from other engine parameters. Control passes to block 104 in which it is determined whether the level of reductant stored within LNC 30 is too low. The current quantity, Q, is compared to the capacity of LNC 30 or full level, $Q_f$, times a factor, emp. Factor emp may be in the range of 0 to 0.2. If emp has a value of 0, the effect is that LNC 30 is fully emptied prior to reloading reductant. If emp has a value of 0.2, it causes LNC 30 to initiate reloading when it still contains about 20% of it full capacity of reductant. If the result of block 104 is negative, control returns to block 100, normal engine operation. If Q is less than emp times $Q_f$ (i.e., a positive result from block 104), control passes to block 106 in which a condition conducive to storing reductant on active sites in LNC 30 is commanded. Control passes to block 108 in which reductant is injected into the exhaust stream. The quantity delivered or added, $Q_a$, is a function of the difference between LNC 30 at full capacity, $Q_f$, less the current level of reductant, Q. Control returns to block 100, normal operation. The value of Q should then be $Q_f$. Although FIG. 6 indicates that block 106, i.e., attaining an appropriate operating condition for storage of reductant on active sites in LNC 30, precedes block 108, the delivery of the reductant. In the course of development, it may be found beneficial to begin the delivery of reductant, step 108, prior to attaining the appropriate operating condition, step 106. It may be found to be preferable to not completely fill LNC 30 to $Q_f$. Instead, it may be preferable to fill LNC 30 to about 90% of $Q_f$ to even further reduce reductant slippage.

In block 106 of FIG. 6, "an operating condition which causes reductant to be stored at active sites in LNC" is commanded. As discussed above, either a temperature in LNC 30 above a threshold temperature (condition B) or exhaust gas concentration of NOx less than a threshold concentration (condition A) is appropriate operating conditions which satisfy the query in block 106. Block 106 of FIG. 6 is shown in detail in FIG. 8 as blocks 1060, 1062, 1064, and 1066. In block 1060, it is determined whether there is a "condition A" which can satisfy both the condition of $[NOx]_{exh} < [NOx]_{thr}$ and the torque demanded by the operator. $[NOx]_{thr}$ is about 25 ppm, which is a very low NOx concentration and not often encountered in typical operating conditions. Such low NOx levels are found at very low torque levels and under deceleration conditions. NOx concentration may be reduced, somewhat, by increasing the amount of EGR or by retarding injection timing. However, there are torque levels for which no combination of fuel injection parameters, EGR valve position, throttle valve position, or other parameters can be found which produce less than $[NOx]_{thr}$ and still satisfies the torque requirement. If a "condition A" can be identified, a positive result in block 1060, and condition A is commanded in block 1062. If no "condition A" can be identified, i.e., a negative result in block 1060, control proceeds to block 1064. In block 1064, an operating condition B is determined which causes the temperature of LNC 30 to exceed the threshold temperature. It is nearly always possible, using the heating methods listed in Table 1, to achieve a temperature exceeding the threshold temperature while satisfying the torque demand. Control passes to block 1066, where the engine controller commands operating condition B to be attained. Control passes to block 108, which was discussed above in regards to FIG. 6.

Figure 8:
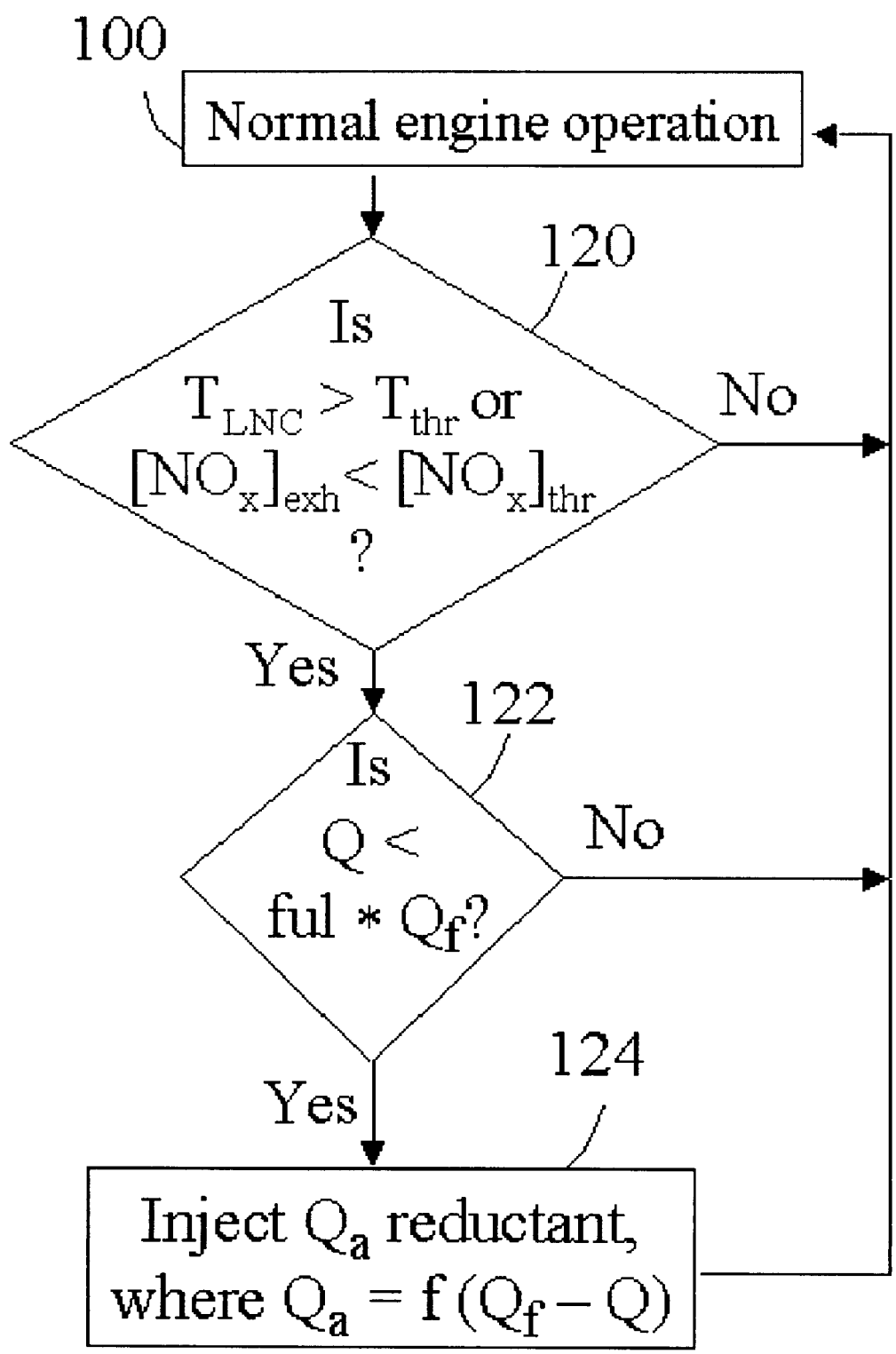
FIG. 8 is a flowchart indicating operation of the engine according to an aspect of the present invention.

A passive scheme, by which the present invention may be practiced, is shown in FIG. 8, which begins with normal engine operation in block 100. Periodically, block 120 is accessed to determine if the current condition is one which leads to storing reductant on active sites. Specifically, is the temperature of the lean NOx catalyst, $T_{LNC}$, greater than a threshold temperature, $T_{thr}$, or is the exhaust gas NOx concentration, $[NOx]_{exh}$, less than a threshold exhaust gas NOx concentration, $[NOx]_{thr}$? If neither of the conditions is satisfied (negative result in block 120), control returns to block 100 for resumption of normal engine operation. If either of the conditions in block 120 is satisfied (positive result in block 120), control passes to block 122. In block 122, it is determined if active sites in LNC 30 is full or nearly full. That is, the current quantity of reductant contained on active sites in LNC 30 is compared with $Q_f$, the active site capacity of LNC 30. The factor, ful, is likely to be in the 0.8 to 1.0 range. If the value of ful is 1.0, reductant would be added. If the value of ful of 0.8 may be used to avoid adding reductant to LNC 30 in which more than 80% of active sites are full. It might be found to prevent reductant slippage that reductant delivery should be avoided when LNC 30 is nearly full. If less than the desired level of reductant is currently stored, i.e., a positive result is returned from block 124, a quantity, $Q_a$, of reductant is added. $Q_a$ is related to the difference of a full LNC 30, $Q_f$, and the current level contained in LNC 30, Q. Control then passes to block 100, normal engine operation. A negative result in block 122 also returns control to block 100.

Prior art methods and the present invention are compared in Table 2.

TABLE 2

| Method | Description | Relative fuel economy | Relative NOx conv. efficiency |
|---|---|---|---|
| Prior art method X | Maintain exhaust temperature greater than 250° C.; reductant delivery nearly continuous | Fair | Good |
| Prior art method Y | Exhaust temperature not controlled; reductant delivery in proportion to | Very good | Fair |

TABLE 2-continued

| Method | Description | Relative fuel economy | Relative NOx conv. efficiency |
|---|---|---|---|
| Method according to an aspect of the present invention | NOx concentration Reductant supplied when exhaust temperature periodically raised above 300° C. | Good | Good |

Prior art methods X and Y demonstrate NOx and fuel efficiency tradeoffs: method Y suffers in NOx conversion efficiency and method X suffers in fuel efficiency. Fuel efficiency suffers with method X because methods by which exhaust temperature is raised lead to a fuel economy penalty. The present invention (shown as curve 76 in FIG. 3) provides NOx conversion efficiency similar to prior art method X (curve 74 in FIG. 3) at temperatures greater than 250° C. The present invention is superior to prior art method X in terms of fuel efficiency because according to an aspect of the present invention, temperature of LNC 30 is increased for a fraction of the time, approximately 5% of the time, compared with prior art method X, which requires a constant higher temperature. Prior art method Y suffers from low NOx conversion efficiency; for example at 200° C., according to FIG. 3, prior art provides 30% NOx conversion efficiency and the present invention provides 85% efficiency. In summary, the present invention provides NOx conversion efficiency as good as the better of prior art methods with a slight fuel efficiency penalty compared to prior art method Y and superior to prior art method X.

The inventors of the present invention have found that reductant supplied to the catalyst during conditions of NOx inhibition is stored on inactive sites. They have also discovered that if NOx inhibiting effects are subsequently removed, reductant stored on inactive sites diffuses to active sites. This phenomenon may also be exploited by supplying reductant at any operating condition and subsequently causing a condition in the engine at which the NOx inhibition is no longer present to achieve the desired effect, i.e., reductant absorbed on active sites.

The embodiments discussed above relate to supplying reductant when prescribed operating conditions prevail in the LNC 30. Although LNC 30 provides higher NOx conversion efficiency by supplying the reductant accordingly, it may be found preferable to utilize a strategy combining both prior art reductant supply method Y and the invention herein to achieve a desired NOx reduction with a minimum penalty on fuel economy.

The embodiments discussed above relate most closely to a diesel engine. However, the invention may apply to any lean-burning combustion system for which reduction of exhaust NOx is desired.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

What is claimed is:

1. A system for controlling reductant addition into lean exhaust gases discharged from an internal combustion engine, the reductant being added upstream of a catalyst coupled to the engine, comprising:

an injector for adding the reductant into the exhaust gases; and an engine controller operably connected to the engine and said injector which actuates said injector to supply the reductant in response to an indication that temperature of the catalyst is greater than a predetermined temperature, provides an estimate of a quantity of reductant stored in the catalyst, and when said quantity exceeds a predetermined quantity, substantially discontinues said addition of reductant wherein the catalyst comprises active sites and inactive sites on which reductant is stored and said estimate of a quantity stored in the catalyst is based on an estimate of reductant stored on active sites.

2. The system of claim 1, wherein said active sites are comprised of copper oxide.

3. The system of claim 1 wherein said predetermined quantity is based on a reductant storage capacity of the catalyst.

4. The system of claim 3 wherein said reductant storage capacity of the catalyst depends on a temperature of the catalyst.

5. The system of claim 1 wherein said predetermined temperature is 300 degrees celsius.

6. The system of claim 1 wherein the reductant is added by an injector disposed upstream of the catalyst and downstream of the engine.

7. The system of claim 1 wherein the reductant contains ammonia.

8. A method for controlling reductant added to exhaust gases from an internal combustion engine, the reductant and exhaust gases flowing into a catalyst coupled to the engine, comprising the steps of:

adding reductant into the exhaust gases at a first delivery rate;

indicating when a temperature of the catalyst is greater than a predetermined temperature;

adding reductant at a second delivery rate into the exhaust gases in response to said indiction, estimating of a stored quantity of reductant within the catalyst; and adding reductant at said first delivery rate when said stored quantity exceeds a predetermined quantity, said first delivery rate being less than said second delivery rate wherein the catalyst comprises active sites and inactive sites on which reductant is stored, said estimate of said stored quantity of reductant in said catalyst being based on an estimate of reductant stored on said active sites of said catalyst.

* * * * *